United States Patent [19]
Womer et al.

[11] Patent Number: 5,931,578
[45] Date of Patent: *Aug. 3, 1999

[54] EXTRUDER AND EXTRUSION SCREW THEREFOR

[75] Inventors: Timothy W. Womer, Edinburgh, Pa.; Vue X. Yang, Sheboygan, Wis.

[73] Assignee: Spirex Corporation, Youngstown, Ohio

[*] Notice: This patent is subject to a terminal disclaimer.

[21] Appl. No.: 09/102,362

[22] Filed: Jun. 23, 1998

Related U.S. Application Data

[63] Continuation of application No. 08/865,212, May 29, 1997, Pat. No. 5,823,668.

[51] Int. Cl.$^6$ ............................. A21C 1/06; B29B 7/14
[52] U.S. Cl. ................................. 366/88; 366/89
[58] Field of Search ............................. 366/323, 88, 89, 366/81, 79, 318; 425/208, 209

[56] References Cited

U.S. PATENT DOCUMENTS

| | | |
|---|---|---|
| 3,164,375 | 1/1965 | Frenkel . |
| 3,268,633 | 8/1966 | Jansen . |
| 3,551,545 | 12/1970 | Overdiep . |
| 3,602,950 | 9/1971 | Biefeidt ................................. 366/89 |
| 3,685,804 | 8/1972 | Stansfield . |
| 3,779,033 | 12/1973 | Swanson ................................. 366/89 |
| 3,795,386 | 3/1974 | Carter et al. . |
| 3,868,093 | 2/1975 | Sokolow ................................. 366/89 |
| 3,868,436 | 2/1975 | Ootsuji et al. . |
| 3,989,433 | 11/1976 | Furman . |
| 4,184,772 | 1/1980 | Meyer . |
| 4,383,764 | 5/1983 | Sloin ................................. 366/88 |
| 4,400,218 | 8/1983 | Koch et al. ................................. 366/88 |
| 4,484,879 | 11/1984 | Heinz et al. . |
| 4,557,885 | 12/1985 | Kiess et al. . |
| 4,632,795 | 12/1986 | Huber et al. . |
| 4,645,445 | 2/1987 | Takanashi . |
| 4,752,136 | 6/1988 | Colby . |
| 4,942,007 | 7/1990 | Kunimoto . |
| 4,944,906 | 7/1990 | Colby et al. . |
| 5,071,256 | 12/1991 | Smith et al. . |
| 5,096,302 | 3/1992 | Durina . |
| 5,110,279 | 5/1992 | Ameniya et al. . |
| 5,147,722 | 9/1992 | Koslow . |
| 5,164,207 | 11/1992 | Durina . |
| 5,178,458 | 1/1993 | Hsu . |
| 5,189,092 | 2/1993 | Koslow . |
| 5,204,039 | 4/1993 | Miyasaka et al. . |
| 5,249,948 | 10/1993 | Koslow . |
| 5,288,223 | 2/1994 | Toro . |
| 5,318,357 | 6/1994 | Colby et al. . |
| 5,397,065 | 3/1995 | Shutov et al. . |
| 5,439,633 | 8/1995 | Durina . |
| 5,655,835 | 8/1997 | Pham et al. . |
| 5,694,833 | 12/1997 | Wenger . |

FOREIGN PATENT DOCUMENTS 56907   9/1944   Netherlands .

*Primary Examiner*—Tony G. Soohoo
*Attorney, Agent, or Firm*—Robert J. Herberger, Esq.

[57] ABSTRACT

An extruder for plasticating and extruding an extrudate, and an extrusion screw used with the extruder form the subject of this invention. The extruder screw includes an elongated root body and a thread portion helically wound about the root body and extending along the length. The screw having a low compression ratio, flight with a reduced helical angle, and a conical, tapered front end section where at least one-half flight of the thread has a pitch associated therewith which is different from the pitch of the remainder of the thread and where the diameter is less than the diameter of the remainder of the root body.

12 Claims, 3 Drawing Sheets

EXTRUDER AND EXTRUSION SCREW THEREFOR

This application is a continuation of application having Ser. No. 08/865,212 filed May 29, 1997, now U.S. Pat. No. 5,823,668, entitled EXTRUDER AND EXTRUSION SCREW THEREFOR.

FIELD OF THE INVENTION

This invention relates to extruders and to extrusion screws which form a part of each extruder. More particularly, this invention relates to extruders and extrusion screws used to form continuous extrusion of non-thermoplastic powdered or granulated materials with thermoplastic materials.

BACKGROUND OF THE INVENTION

Extruders for extruding thermoplastic and non-thermoplastic materials are available in different sizes and shapes and with one or more extrusion screws. This invention focuses on those extruders which have a single extrusion screw rotating in a tightly fitted barrel. This type of extruder utilizes the mechanical energy introduced through the screw shaft and the thermal energy from the heated barrel surface converting (plasticating) the thermoplastic material (solid polymer pellets or powder) into a uniform melt at a certain temperature and pressure. The agglomerated melted mass is then shaped into a body by being passed through a die assembly which extends the longitudinal axis adjacent to the barrel.

With an extruder of the extrusion screw type, continuous operation is possible, i.e., the process of loading the extruder with raw materials (pellets, for example) and extruding the finished product (extrudate) is relatively continuous. This is a desirable feature of this type of extruder. Therefore, in the continuous process, the extruder needs to convey, melt, mix and pump the material.

A disadvantage of the current state of the art with this type of extruder for the extrusion of mixed composite articles having a thermoplastic resin binder and non-thermoplastic powdered or granular material is that, as the mixed mass of material flows off the screw and into the die, and begins to cool and harden, the flights extending from the screw creates a spiraling "knit mark" along the outer surface of the material. This spiraling knit mark which travels along the axial length of the extrudate product results in a spiral weak area which has lower density and greater porosity. To demonstrate the inferior effect of the spiral "knit marks", an experiment was conducted on two extrudates (hollow cylinders). The first extrudate made using conventional parameters had spiral "knit marks", and the second made using this invention did not. The extrudate with the marks demonstrated a breaking strength of 198 lbs. The extrudate without the marks demonstrated a product approximately 40% stronger having a breaking strength of 276 lbs.

In the past, the primary solution to overcome the problem of spiral weak areas caused by the spiral "knit marks" has been to form the extrudate product with an overall greater density, i.e., the alternating spiral of greater density and lower porosity is made denser and less porous than necessary. However, this results in higher production costs due to increased material usage, lower production rates, increased extruder usage (wear and tear) and higher power consumption. It would therefore be desirable to have a way to eliminate these "knit marks" without the disadvantages noted above. A general object of this invention, then, is to provide a solution to the noted problem without the noted disadvantages.

A more specific object of this invention is to provide an extruder and an extrusion screw for the continuous extrusion of thermoplastic materials with non-thermoplastic materials to form a product without "knit marks" having a uniform density with consistent porosity.

SUMMARY OF THE INVENTION

With this invention, the state-of-the-art has been improved by the provision of an extruder and a helical extrusion screw forming a part of the extruder, which produces an extruded product, or extrudate, without spiral "knit marks."

The screw is provided with a low compression ratio, flight with a reduced helical angle, and a conical, tapered front end section which has at least the last one-half flight of its' thread configured to have a sufficiently different pitch or angle than the remainder of the thread. The conical end has a decreasing screw root diameter as well, which together with the differing pitch or angle allows the flowing material to be agitated and mixed such that the extrudate is uniform and homogeneous without "knit marks."

With the extruder of this invention, the continuous formation of a uniform homogeneous extrudate is possible. Greater production capacity and a product of greater strength with no visible spiral knit marks nor areas of spiraling lower and higher density are achieved.

BRIEF DESCRIPTION OF THE DRAWINGS

Five figures have been selected to illustrate a preferred embodiment of the present invention. These figures along with the accompanying description are schematic but sufficient for those skilled in the art to practice the invention as claimed. Included are:

DETAILED DESCRIPTION

Figure 1:
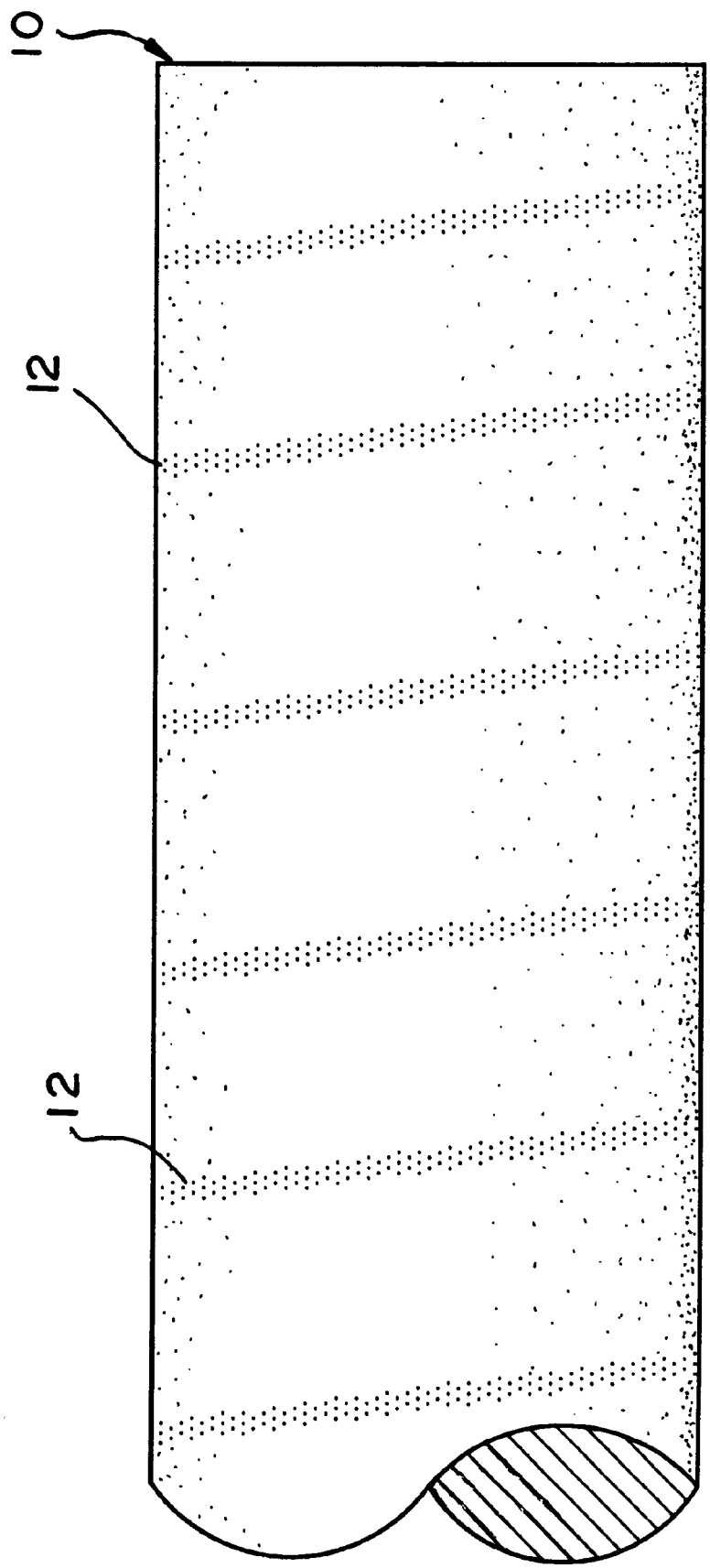
FIG. 1, which illustrates an extrudate with spiral knit marks.

FIG. 1 shows the section of an extrudate product extruded with an extruder having a single extrusion screw but without the inventive features of the present invention. The extrudate 10 as extruded includes helically oriented "knit marks" 12 produced as noted above.

Figure 2:
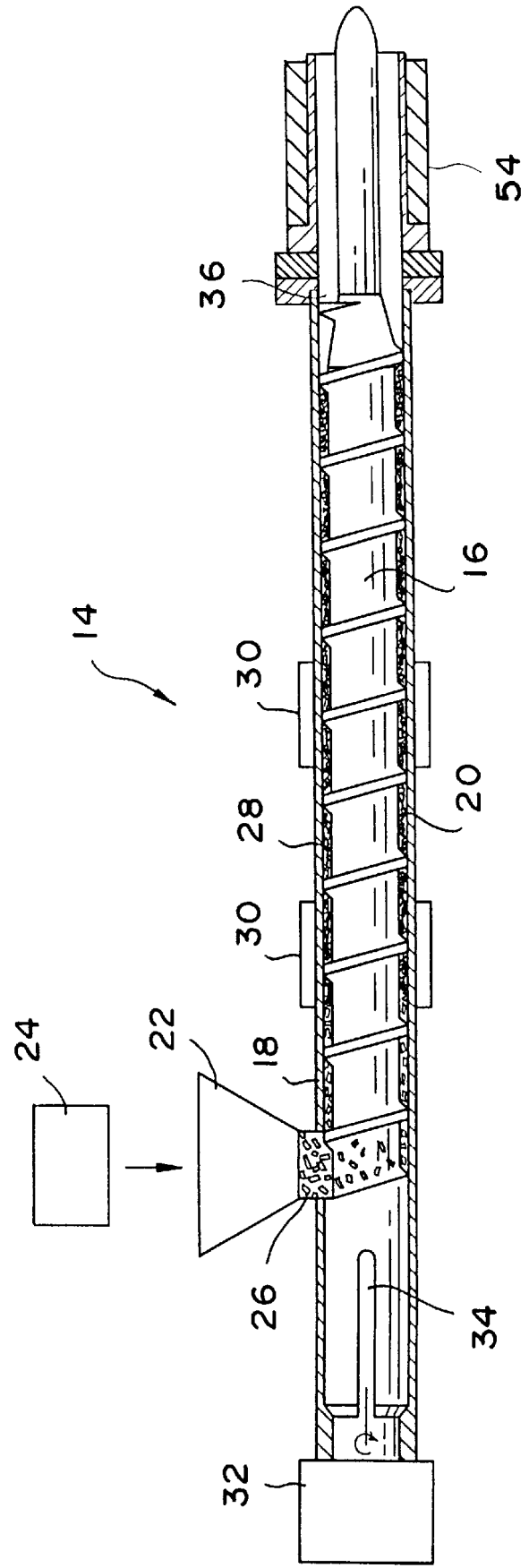
FIG. 2, which illustrates, in partial cross section, an extruder with a helical extrusion screw including the improved front end.

To eliminate these marks, the extruder 14 shown in FIG. 2, is provided with a uniquely designed extrusion screw 16. In the preferred embodiment, extruder 14 is designed to continuously extrude porous activated carbon block filter elements formed from premixed materials such as non-thermoplastic granular or powdered carbon and a thermoplastic polyolefin binder such as polyethylene. However, it is contemplated as being within the scope of the present invention to provide an extruder apparatus to produce other composite solid articles from a mixture of other thermoplastic with non-thermoplastic materials.

In a typical fashion the extruder 14 includes in its' essential elements, in addition to the extrusion screw 16, an elongated barrel or housing 18 which defines an elongated interior passage 20 in which the extrusion screw 16 extends. At one end of the barrel 18 a hopper 22 is mounted which receives the premixed material from a material supply 24. As previously stated, the preferred premixed material 26 comprises a thermoplastic binder material, for example, polyethylene, and a powdered or granular primary material such as activated carbon. The premixed material 26 is shown in FIG. 2. The premixed material 26 is moved by the extrusion screw 16 through the passage 20 to the front end section of the extruder. In the process the thermoplastic binding material melts as it absorbs heat from the barrel 18 through heaters 30 (only two are shown). The melted material creates "bridges" between the carbon granules so as to form an agglomerated mass 28.

The material is transported by the mechanical work from the rotation of the extrusion screw 16 using a drive 32. The drive 32 engages and rotates the extrusion screw 16 through a slot 34 (spline and slot, for example). The drive 32 may be an electric motor, a belt drive, a gear drive, or the like. The agglomerated mass 28 formed by heating is mixed and pumped by the extrusion screw 16 through output end 36 of barrel 18. The output end 36 feeds into an input end of a die assembly 54.

The barrel, hopper, material supply, drive, heaters and die assembly are schematically shown in FIG. 2 because they are all known structural components. A more detailed study of the extrusion screw 16 (FIG. 3) follows. Here too, the screw 16 is shown schematically because, with the exception of its' front end section, compression ratio and the unique helical angle and pitch of the thread 42 throughout the screw 16, it possesses a known basic configuration.

The extrusion screw 16 is theoretically divided into three sections: the feed section; the compression section; and the metering section. This invention further includes a continuous flight or thread 42 throughout the feed, compression and metering sections. Within the metering section is a tapered front end section. The feed section is that section which is fed directly from the hopper 22. A feed pocket 38 facilitates the feeding action. The premixed materials 26 is fed into the feed section and moved from there to the compression section where the materials are formed into a solid bed. Also in the compression section, the thermoplastic binder material begins to melt.

As the material is being conveyed in the forward direction, air is being squeezed in the opposite rearward direction. As understood in the art, the term "compression ratio" means the ratio of the volume of material held in the first channel at the feed section to the volume of material held in the last channel in the metering section. For purposes of determining the compression ratio in this invention, the last channel of the metering section is between the flight just prior to the tapered front end section. Preferably in this invention, the compression ratio associated with the extrusion screw 16 is low, and approximately 1.5.

In the compression section, compression is achieved by tapering upward the diameter of the screw root body 40, or sometimes by decreasing the inside diameter of the barrel, to achieve a reduced volume transferred between the screw thread 42 and the root body. The former is the more preferred and prevalent approach. From the compression section, the materials are moved to the metering section where melting is completed and the agglomerated mass 28 is formed and advanced at a uniform rate to the front end section, the output end 36, and then to the die assembly 54.

In all three sections in this invention (feed, compression and metering), the helix angle $\theta$ of the flight throughout is preferably less than 17.7°, with the most preferred helix angle $\theta$ being 16°. As is understood in the art, the helix angle $\theta$ is equal to the inverse tangent of the lead length divided by the circumference of the root body at the point of the screw 16 where the helix angle is being determined. Although the helix angle $\theta$ may vary between the feed, compression and metering sections, in the preferred embodiment the helix angle $\theta$ is constant. However, in the front end section, preferably the helix angle $\theta$ is different then the helix angle $\theta$ of the other sections of the screw 16.

Figure 3:
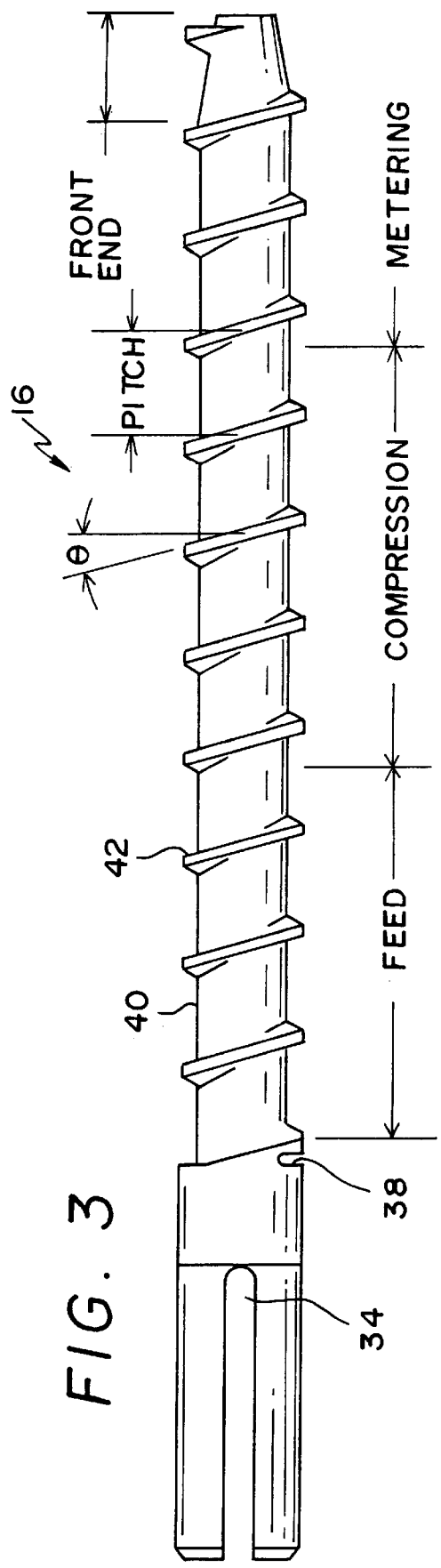
FIG. 3, which illustrates the helical extruder screw shown in the extruder of FIG. 2 in greater detail.
Figure 5:
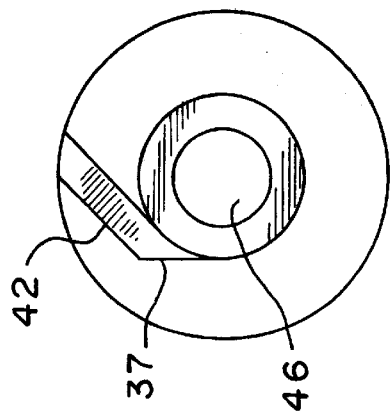
FIG. 5, which illustrates a front view of the helical extruder screw of FIGS. 2 through 4.
Figure 4:
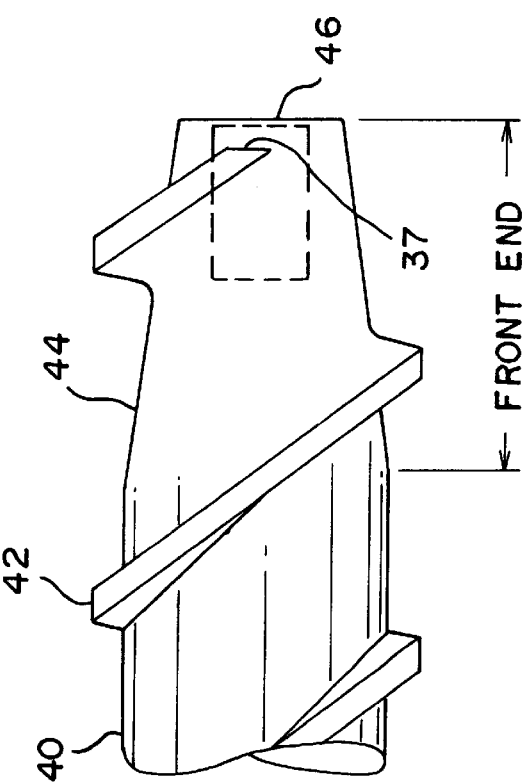
FIG. 4, which illustrates an enlarged view of the front end of the helical extruder screw of FIGS. 2 and 3.

In addition, the diameter of the root body of the front end section is tapered downwardly, as shown in FIGS. 2, 3 and 4. Preferably, the taper in the front end section produces a diameter reduction of approximately 40%. This results in an increase in the volume of the agglomerated material 28 being transfered by the flight in the front end section. The taper of the front end section acts to provide a region of increased volume for the heated agglomerated material 28 as it passes from the extruder into the die assembly 54. Viewing FIG. 4, the front end section includes a blind bore 46 in phantom), used to receive and mount an appropriate end mandrel, or the like, in the die assembly 54. Helical flight 42 terminates in the front end section of screw 12 at a surface 37 which is transverse and, preferably, perpendicular to the longitudinal axis along which screw 12 extends.

The extrusion screw 16 with the conical tapered front end section with the last one-half flight having a sufficiently different pitch or angle to disrupt the previous screw fight pattern, the low compression ratio and the reduced helix angle $\theta$ produces an extrudate without spiral "knit marks."The conical tapered front end section having a decreasing root body diameter allows space for the flowing melt to become mixed and agitated by the differently angled one-half flight. The agitation and mixing of the material that occurs has been found to disrupt the spiral pattern which is otherwise imparted to the composite material by the screw without these inventive features.

This unique screw design and process of extrusion allows for the continuous formation of a uniform homogeneous extruded product. This in turn provides for greater production capacity and a product of greater strength and more uniformity with no visible spiral "knit marks" nor areas of lower and higher density with inconsistent porosity. It will thus be seen that a new and useful extruder and extrusion screw have been illustrated and described. It will be apparent to those skilled in the art that various changes or modifications may be made to the invention without departing from the spirit of the invention. There are various modes of carrying out the invention. These various modes are contemplated as being within the scope of the invention which are particularly pointed out and distinctly identified in the claims that follow.

Therefore, we claim:

1. An extruder for plasticating and extruding an extrudate, comprising:

an elongated barrel defining an interior elongated cylindrical passage of generally constant diameter;

an elongated extrusion screw received in the interior cylindrical passage of said barrel, said extrusion screw including an elongated root body and a thread portion helically wound about said root body and extending along the length thereof, the elongated root body having a generally constant diameter, said extrusion screw defining a conical, tapered front end section having a minimum diameter at the front end of the screw, the taper of said conical, tapered front end section having a diameter reduction of at least 40% at the front end of said conical tapered front end section in comparison with the diameter of said root body, at least the last one-half revolution of the flight of said thread portion has a pitch associated therewith which is different from the pitch of the remainder of said thread portion, and where said conical, tapered front end section defines with said interior cylindrical passage a region of increased volume;

means for rotating said extrusion screw relative to said barrel;

means for supplying material to be plasticated to said interior elongated passage; and means for heating said barrel and thereby the material to be plasticated as the material to be plasticated is moved through said interior elongated passage by the rotation of said extrusion screw.

2. An extruder for plasticating and extruding an extrudate, comprising:

an elongated barrel defining an interior elongated cylindrical passage of generally constant diameter;

an elongated extrusion screw received in the interior cylindrical passage of said barrel, said extrusion screw including an elongated root body and a thread portion helically wound about said root body and extending along the length thereof, the elongated root body having a generally constant diameter, said extrusion screw defining a conical, tapered front end section having a minimum diameter at the front end of the screw, the compression ratio of said extrusion screw being not more than 1.5, the helix angle associated with a metering section upstream from said front end section is not more than 17.7°, at least the last one-half revolution of the flight of said thread portion has a pitch associated therewith which is different from the pitch of the remainder of said thread portion, and where said conical, tapered front end section defines with said interior cylindrical passage a region of increased volume;

means for rotating said extrusion screw relative to said barrel;

means for supplying material to be plasticated to said interior elongated passage: and means for heating said barrel and thereby the material to be plasticated as the material to be plasticated is moved through said interior elongated passage by the rotation of said extrusion screw.

3. An elongated extrusion screw for an extruder including an elongated barrel defining a cylinder interior within which with the rotation of the screw plasticates and extrudes an extrudate, the screw comprising:

an elongated root body; and a thread portion helically wound about said root body and extending along the length thereof, said extrusion screw defining a conical, tapered front extrusion end section where at least one-half revolution of the flight of said thread portion has a pitch associated therewith which is different from the pitch of the remainder of said thread portion, and where said conical tapered front end extrusion section defines a region of increased volume for agitation and mixing of extrudate, wherein the elongated root body has a generally constant diameter and the taper of said conical, tapered front end section has a diameter reduction of at least 40% in comparison with the diameter of said root body.

4. An elongated extrusion screw for an extruder including an elongated barrel defining a cylindrical interior within which with the rotation of the screw plasticates and extrudes an extrudate the screw comprising:

an elongated root body; and a thread portion helically wound about said root body and extending along the length thereof, said extrusion screw defining a conical, tapered front extrusion end section where at least the one-half revolution of the flight of said thread portion has a pitch associated therewith which is different from the pitch of the remainder of said thread portion and where said conical, tapered front end extrusion section defines a region of increased volume for agitation and mixing of extrudate, wherein the compression ratio of said extrusion screw is not more than 1.5, the helix angle associated with said thread in a metering section and feed section is not more than 17.7°, and the taper of said front end section is approximately 40% relative to the remainder of said root body.

5. An extruder for plasticating and extruding an extrudate comprising:

an elongated barrel defining an interior elongated cylindrical passage of generally constant diameter;

an elongated extrusion screw received in the interior cylindrical passage of said barrel, said extrusion screw including an elongated root body and a thread portion helically wound about said root body and extending along the length thereof, said extrusion screw defining a conical, tapered front end section having a minimum diameter at the front end of the screw, at least approximately the last one-half revolution of the flight of said thread portion on said tapered front end section has a helix angle associated therewith which is less than the angle of the remainder of said thread portion, and where said conical tapered front end section defines with said interior cylinder passage a region of increased volume;

means for rotating said extrusion screw relative to said barrel;

means for supplying material to be plasticated to said interior elongated passage; and means for heating said barrel and thereby the material to be plasticated as the material to be plasticated is moved through said interior elongated passage by the rotation of said extrusion screw.

6. The extruder as set forth in claim 5, wherein the taper of said conical tapered front end section has a diameter reduction of at least 40% at the front end of said conical tapered front end section in comparison with the adjacent diameter of said root body.

7. The extruder as set forth in claim 5 wherein the thread portion having a reduced helix angle comprises a surface portion generally transverse to the screw axis.

8. The extruder as set forth in claim 7 wherein said transverse surface portion is perpendicular to the axis of the screw.

9. An elongated extrusion screw for an extruder including an elongated barrel defining a cylindrical interior within which with the rotation of the screw plasticates and extrudes an extrudate, the screw comprising:

an elongated root body; and a thread portion helically wound about said root body and extending along the length thereof, said extrusion screw defining a conical, tapered front extrusion end section where approximately the last one-half revolution of the flight of said thread portion has a helix angle associated therewith which is reduced from the helix angle of the remainder of said thread portion, and where said conical, tapered front extrusion end section defines a region of increased volume for agitation and mixing of extrudate.

10. The elongated extrusion screw as defined in claim 9 wherein the taper of said conical, tapered front end section has a diameter reduction of at least 40% in comparison with the diameter of the immediately adjacent portion of said root body.

11. The extrusion screw as set forth in claim 9 wherein said thread portion having a different helix angle comprises a flat surface portion on said last one-half revolution of the flight extending generally transverse with respect to the axis of rotation of said screw.

12. The extrusion screw as set forth in claim 11, wherein said transverse surface portion extends to the end of the flight.

* * * * *